United States Patent Office

3,560,440
Patented Feb. 2, 1971

3,560,440
HIGH MOLECULAR WEIGHT LINEAR AROMATIC COPOLYAMIDES
Heinrich Gilch, Gerhard Darsow, and Ludwig Bottenbruch, Krefeld-Bockum, and Hermann Schnell, Krefeld-Uerdingen, Germany, assignors to Farbenfabriken Bayer Aktiengesellschaft, Leverkusen, Germany
No Drawing. Filed Apr. 3, 1969, Ser. No. 813,278
Claims priority, application Germany, Apr. 13, 1968,
P 17 70 203.3
Int. Cl. C08g *20/00*
U.S. Cl. 260—47                                6 Claims

ABSTRACT OF THE DISCLOSURE

High molecular linear aromatic copolyamides by co-condensation of aminophenoxybenzoic acid esters of the general formula

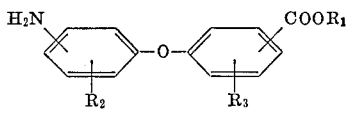

wherein:

$R_1$ represents an alkyl or aryl radical and
$R_2$ and $R_3$ represent hydrogen, alkyl or aryl radicals, together with equivalent amounts of aromatic diamines and aromatic dicarboxylic acids or with aromatic aminocarboxylic acids.

---

The invention relates to high molecular weight linear aromatic copolyamides which contain diphenylether units.

Fully aromatic polyamides have good mechanical properties and relatively high heat resistance. They are however difficult to process. The melting points are frequently close to or above the decomposition point so that they cannot be processed in the thermoplastic state. Only a few of these products are soluble in polar solvents and even then solution can frequently only be achieved after the addition of inorganic salts such as lithium chloride. When producing films from such salt containing solutions, it is difficult to remove the salts completely from the film.

It is an object of this invention to provide high molecular weight linear aromatic copolyamides which are soluble in polar organic solvents, as for example in alkyl substituted amides and lactams, e.g. dimethylformamide, dimethylacetamide N-methylpyrrolidone and hexamethyl phosphoric acid triamide.

It is another object of this invention to provide high molecular weight linear aromatic copolyamides that are able to be readily processed.

These objects are accomplished by a high molecular weight linear aromatic copolyamide comprising the recurring structural units

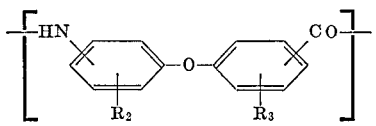

and

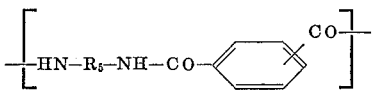

wherein $R_2$ and $R_3$ represent hydrogen, alkyl or aryl radicals or halogen atoms and $R_5$ represents a radical of the formula

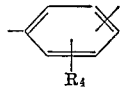

in which $R_4$ is hydrogen, an alkyl or aryl radical or a halogen atom,

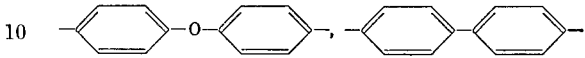

or

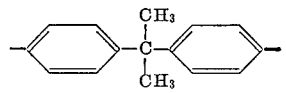

the copolyamides having a relative solution viscosity (measured on a solution of 0.5 g. of the polymer in 100 ml. of N-methyl pyrrolidone at 20° C. in an Ubbelohde viscosimeter) of above 1.18.

It is still another object of this invention to provide a process for the preparation of high molecular weight, linear aromatic copolyamides which comprises polycondensing:

(a) An aminophenoxybenzoic acid ester of the general formula

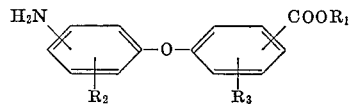

wherein $R_1$ represents an alkyl or aryl radical and $R_2$ and $R_3$ represent hydrogen, alkyl or aryl radicals or a halogen atom, and (b) Equimolar amounts of:
(1) An aromatic diamine of the general formula $$H_2N-R_5-NH_2$$

in which $R_5$ represents a radical of the general formula

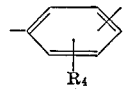

in which $R_4$ is hydrogen, an alkyl or aryl radical or a halogen atom,

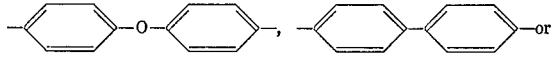

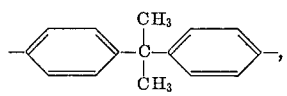

and (2) A dicarboxylic acid ester selected from the group consisting of a terephthalic acid ester, an isophthalic acid ester and a mixture of a terephthalic and an isophthalic ester, said polycondensing being carried out at temperatures of between 150 and 350° C.

This process can, if desired, be carried out in the presence of a basic catalyst and, if desired, in a solvent.

Condensation proceeds very rapidly if the appropriate phenyl esters are used. The reaction is catalysed by alkaline compounds such as alkali metal oxides and alkali metal hydroxides but catalysis with weakly basic organic compounds such as imidazole and pyridine derivatives is also possible.

The preparation of the polyamides according to the invention may also be carried out by co-polycondensation of the hydrochloride of an aminophenoxybenzoic acid chloride with iso- or tere-phthalic acid chloride and phenylene diamines in the presence of acid acceptors.

The polycondensation may be carried out in solution or in the melt. For polycondensation in solution, high boiling polar solvents such as alkylated acid amides, e.g. dimethylacetamide and hexamethylphosphoric acid triamide are preferred.

If the process is carried out without solvents, it is advantageous to carry out a preliminary condensation below the boiling point of the phenol which is formed in order to avoid loss of starting materials. Condensation is then continued at higher temperatures (240 to 300° C.) and the phenol which is formed is distilled off directly. This phase of condensation is advantageously carried out in vacuo (0.05 to 10 mm. Hg.).

If the reaction mass solidifies before the required molecular weight has been reached, polycondensation may be accelerated by breaking up the reaction material mechanically before further condensation.

Furthermore, a low molecular weight polycondensate obtained in the first stage in the melt, in which at least 80% and preferably at least 95% of the theoretical amount of phenol formed is distilled off, may thereafter be dissolved in the above-mentioned solvents and condensation may then be continued in solution. The advantage of this two-stage process compared with a mere solution condensation is the low phenol content present in the solution.

The following are examples of suitable aminophenoxy benzoic acid esters to be used in the process according to the invention and which are of the general formula

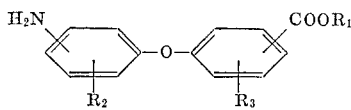

in which $R_1$, $R_2$ and $R_3$ have the meanings as given above: 4'-amino-4-phenoxybenzoic acid phenyl ester, 3'-amino-4-phenoxybenzoic acid phenyl ester, 2'-amino-4-phenoxybenzoic acid phenyl ester, 4'-amino-3-phenoxybenzoic acid phenyl ester and 4'-amino-2-phenoxybenzoic acid phenyl ester.

It is preferred to use 4'-amino-4-phenoxybenzoic acid phenyl ester.

Phenylene diamines, which may be substituted by alkyl or aryl groups or by halogen atoms, of the general formula

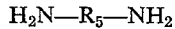

in which $R_5$ has the meaning as given above, are suitable for use in the reaction. The following are examples of such suitable diamines: m-phenylene diamine, 2,4-diaminotoluene, 1-chloro-2,4-diaminobenzene, 1-chloro-3,5-diaminobenzene or also O- and p-phenylene diamines such as o-phenylene diamine, 4-chloro-o-phenylene diamine, 4-methyl-o-phenylene diamine, p-phenylene diamine, 2-chloro-p-phenylene diamine and 2-methyl-p-phenylene diamine, also dinuclear aromatic diamines such as 4,4'-diaminodiphenyl ether, 4,4'-diaminodiphenyl or 4,4'-diaminodiphenylpropane-(2,2). m-Phenylene diamines are preferred.

The dicarboxylic acid esters used in the process according to the invention are isophthalic and terephthalic acid esters. The diphenylester of isophthalic acid is preferred.

The molar ratio of aminophenoxybenzoic acid ester to diamine+dicarboxylic acid may vary within wide limits but preferably lies within the range of 10 mols of aminophenoxybenzoic acid ester for one mol each of diamine and dicarboxylic acid to one mol of aminophenoxybenzoic acid ester for 10 mols each of diamine and dicarboxylic acid.

The polymers may be processed by conventional methods to produce foils from solution. Relatively low melting products such as the condensate of isophthalic acid diphenyl ester, 2,4-diaminotoluene and 4'-aminophenoxybenzoic acid phenyl ester may be processed to provide shaped products in known manner.

The following examples are to further illustrate the invention without limiting it.

EXAMPLE 1

A mixture of 15.9 g. (0.05 mol) of isophthalic acid phenyl ester, 5.4 g. (0.05 mol) of m-phenylene diamine, 15.25 g. of 4'-amino-4-phenoxybenzoic acid phenyl ester and 0.2 g. of imidazole are heated at 240° C. for 4 hours under an atmosphere of nitrogen. The product is then kept at 290° C. at a pressure of 10 mm. Hg for 3 hours until the theoretically calculated quantity of phenol has been distilled off.

The polymer is dissolved in dimethylformamide and precipitated with tetrahydrofuran. The relative solution viscosity $\eta_{rel}$ (measured on a solution of 0.5 g. of the polymer in 100 ml. of dimethylformamide at 20° C. in an Ubbelohde viscosimeter) is 1.68.

A film cast from a solution in dimethylformamide is found to have the following mechanical properties:

Tensile stress yield point—1385 kg. wt./cm.$^2$
Elongation yield point—8%
Breaking stress—1304 kg. wt./cm.$^2$
Elongation at break—10%
E modulus from tensile test—289,000 kg. wt./cm.$^2$

EXAMPLE 2

A mixture of 6.10 g. (0.05 mol) of 2,4-toluenediamine, 15.91 g. (0.05 mol) of isophthalic acid diphenylester, 15.10 g. (0.05 mol) of 4'-amino-4-phenoxybenzoic acid phenyl ester and 10 mg. of sodium methylate is heated for 3 hours at 180° C. and for one hour at 260° C. under an atmosphere of nitrogen and the phenol which is formed is distilled off. Condensation is then continued for 2 hours at 260° C. under a pressure of 0.3 mm. Hg until the product solidifies. The copolyamide is powdered. Half of the polymer is then further condensed for 2 hours at 260° C. at 0.3 mm. Hg. The polymer then obtained is soluble in the following solvents: N-methylpyrrolidone, dimethylformamide, dimethylsulphoxide, and hexamethylphosphoric acid triamide.

Relative solution viscosity $\eta_{rel}$ (measured on a solution of 0.5 g. of the polymer in 100 ml. of N-methylpyrrolidone at 20° C. in an Ubbelohde viscosimeter) 1.19. Melting range 330 to 350° C.

The other half is dissolved in N-methylpyrrolidone and heated at 140° C. for 3 hours.

Relative solution viscosity $\eta_{rel}$ (measured on a solution of 0.5 g. of the polymer in 100 ml. of N-methylpyrrolidone at 20° C. in an Ubbelohde viscosimeter) 1.25.

EXAMPLE 3

Polycondensation is carried out as in Example 1 but using 0.05 mol of 4,4'-diaminodiphenyl ether instead of m-phenylene diamine. The polymer is soluble in N-methylpyrrolidone, hexamethylphosphoric acid triamide and dimethylsulphoxide. The polyamide softens at temperatures above 350° C.

Relative solution viscosity $\eta_{rel}$ (measured on a solution of 0.5 g. of the polymer in 100 ml. of N-methylpyrrolidone at 20° C. in an Ubbelohde viscosimeter) 1.21.

EXAMPLE 4

Polycondensation is carried out as in Example 1 but using 0.05 mol of 4,4'-diaminodiphenyl instead of m-phenylene diamine. The polymer is soluble in hexamethylphosphoric acid triamide and N-methylpyrrolidone and melts without decomposition at temperatures above 420° C. in a nitrogen atmosphere.

Relative solution viscosity $\eta_{rel}$ (measured on a solution of 0.5 g. of the polymer in 100 ml. of N-methylpyrrolidone at 20° C. in an Ubbelohde viscosimeter) 1.29.

What we claim is:

1. A high molecular weight linear aromatic copolyamide consisting essentially of the recurring structural units

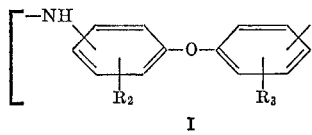 and 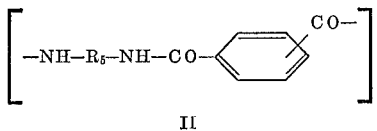

I  II wherein:
R$_2$ and R$_3$—represent hydrogen
R$_5$—represents

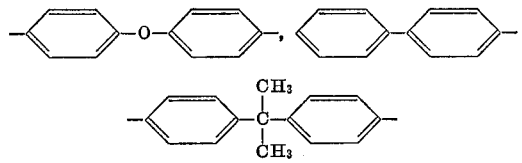

or the radical of the formula

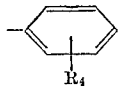

wherein R$_4$ is a member selected from the class consisting of hydrogen, an alkyl radical, an aryl radical and a halogen atom,
the copolyamides having a relative solution viscosity (measured on a solution of 0.5 g. of the polymer in 100 ml. of N-methyl-pyrrolidone at 20° C. in an Ubbelohde viscosimeter) of above 1.18.

2. The high molecular weight copolyamide of claim 1, said structural unit I and said structural unit II being present in a molar ratio of from 1:10 to 10:1.

3. A process for the preparation of high molecular weight linear aromatic copolyamides which comprises polycondensing:
(a) an aminophenoxybenzoic acid ester of the general formula

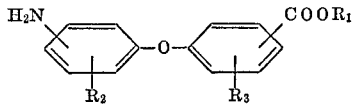

wherein:
R$_1$—represents an alkyl or aryl radical and
R$_2$ and R$_3$—represent a member selected from the group consisting of hydrogen, an alkyl radical, an aryl radical and a halogen atom (b) equimolar amounts of:
(1) an aromatic diamine of the general formula H$_2$N—R$_5$—NH$_2$ wherein:
R$_5$—represents

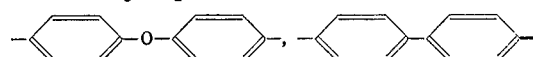

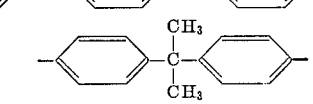

or the radical

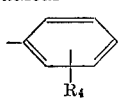

in which R$_4$ is a member selected from the group consisting of hydrogen, an alkyl rad- and
ical, an aryl radical and a halogen atom,
(2) a dicarboxylic acid ester selected from the group consisting of a terephthalic acid ester, an isophthalic acid ester and a mixture of a terephthalic and an isophthalic ester,
said polycondensing being carried out at temperatures of between 150 and 350° C.

4. The process of claim 3, said polycondensing being carried out in the presence of a basic catalyst.

5. The process of claim 8, said polycondensing being carried out in a solvent.

6. The process of claim 2, said polycondensing being carried out in the melt until more than 80% of the theoretical quantity of alcohol or phenol has been split off and then being continued in solution.

References Cited

UNITED STATES PATENTS

| | | | |
|---|---|---|---|
| 2,688,011 | 8/1954 | Wheatley et al. | 260—78 |
| 3,225,011 | 12/1965 | Preston et al. | 260—78 |
| 3,418,275 | 12/1968 | Stephens | 260—47 |
| 3,472,819 | 10/1969 | Stephens | 260—78 |

WILLIAM SHORT, Primary Examiner

L. L. LEE, Assistant Examiner

U.S. Cl. X.R.

117—161; 260—30.2, 32.4, 32.6, 32.8, 78

UNITED STATES PATENT OFFICE
CERTIFICATE OF CORRECTION

Patent No. 3,560,440　　　　　　　　　　Dated Feb. 2, 1971

Inventor(s) Heinrich Gilch, et al.

It is certified that error appears in the above-identified patent and that said Letters Patent are hereby corrected as shown below:

| COLUMN | LINE | ERROR |
|---|---|---|
| 6 | Claim 5, Line 1 | "8" should be ---3--- |

Signed and sealed this 21st day of September 1971

(SEAL)
Attest:

EDWARD M. FLETCHER, JR.
Attesting Officer

ROBERT GOTTSCHALK
Acting Commissioner of P

FORM PO-1050 (10-69)